(12) United States Patent
Fujimoto

(10) Patent No.: US 6,201,341 B1
(45) Date of Patent: Mar. 13, 2001

(54) VIBRATOR FOR DETECTING ANGULAR VELOCITIES ABOUT TWO AXES AND VIBRATING GYROSCOPE HAVING THE SAME

(75) Inventor: Katsumi Fujimoto, Toyama-ken (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/325,141

(22) Filed: Jun. 3, 1999

(30) Foreign Application Priority Data

Jun. 12, 1998 (JP) .................................................. 10-165166

(51) Int. Cl.[7] ............................. G01C 19/56; H01L 41/08

(52) U.S. Cl. ...................................... 310/367; 310/316.01

(58) Field of Search ............................... 310/316.01, 367, 310/368

(56) References Cited

U.S. PATENT DOCUMENTS 4,641,055 * 2/1987 Tanaka ................................... 310/367
5,847,487 * 12/1998 Maeno .................................. 310/367

FOREIGN PATENT DOCUMENTS

| 0735344 | 10/1996 | (EP) | ............................. | G01C/19/56 |
| 06003153 | 1/1994 | (JP) | ............................. | G01C/19/56 |
| 7-19878 | 1/1995 | (JP) | ............................. | G01C/19/56 |
| 07113644 | 5/1995 | (JP) | ............................. | G01C/19/56 |
| 9745702 | 12/1997 | (WO) | ............................. | G01C/19/00 |

* cited by examiner

Primary Examiner—Thomas M. Dougherty
(74) Attorney, Agent, or Firm—Ostrolenk, Faber, Gerb & Soffen, LLP

(57) ABSTRACT

A vibrator includes a vibratable body of a flat plate shape and four notches provided from four parts of the outer periphery of said vibrating body with approximately equal intervals to a center of said vibratable body. A vibrating gyroscope includes the vibrator, as well as a drive unit and a detecting unit.

8 Claims, 7 Drawing Sheets

TO PIEZOELECTRIC ELEMENT 17

VIBRATOR FOR DETECTING ANGULAR VELOCITIES ABOUT TWO AXES AND VIBRATING GYROSCOPE HAVING THE SAME

BACKGROUND OF THE INVENTION

1. Field of the Invention

The present invention relates to a vibrator to be used for a vibrating gyroscope, and a vibrating gyroscope using the vibrator. More particularly, the present invention relates to a vibrator which is capable of detecting rotational angular velocities around two, non-parallel axes, and which is used for hand shake prevention of a video camera, the navigation system of an automobile, a pointing device or the like, and a vibrating gyroscope using the vibrator.

2. Description of the Related Art

A vibrating gyroscope which is generally known as a conventional vibrating gyroscope and has a tuning-fork type vibrator or a sound-piece type vibrator can detect only one rotational angular velocity around one axis. In recent years, however, the market has demanded a vibrating gyroscope capable of detecting two rotational angular velocities around two axes to provide increased sensitivity and accuracy.

To satisfy the demand, the applicant of the present invention has already proposed two types of vibrating gyroscopes as discussed below.

FIG. 8 shows a first example of a vibrating gyroscope disclosed in Japanese Unexamined Patent Publication No. 7-19878.

A vibrating gyroscope 100 includes a first riangular prismatic vibrator 101 and a second triangular prismatic vibrator 102. The first vibrator 101 is provided with a first vibrating body 103 and two first piezoelectric elements 105 formed on two side surfaces of the first vibrating body 103. Only one of the two first piezoelectric elements 105 is shown in the figure. The second vibrator 102 is provided with a second vibrating body 104 and two second piezoelectric elements 106 formed on two side surfaces of the second vibrating body 104. only one of the two second piezoelectric elements 106 is shown in the figure.

The first vibrator 101 is joined with the second vibrator 102 so that the first vibrator 101 is approximately orthogonal to the second vibrator 102 in the vicinity of a center part of a surface on which no piezoelectric element is formed in the first vibrating body 103 and the second vibrating body 104, respectively.

In the vibrating gyroscope 100 of such a construction, the two first piezoelectric elements 105 and the two second piezoelectric elements 106 are connected to an output end of a drive circuit (not shown). Further, the two first piezoelectric elements 105 are connected to an input end of a first detection circuit (not shown). Still further, the two second piezoelectric elements 106 are connected to an input end of a second detection circuit (not shown).

In this vibrating gyroscope 100, a similar drive signal is inputted from the drive circuit to the two first piezoelectric elements 105 and the two second piezoelectric elements 106, and the first vibrator 101 and the second vibrator 102 are respectively flexural-vibrated in a direction orthogonal to the joining surface of the first vibrating body 103 with the second vibrating body 104.

When a rotational angular velocity around the axis of the first vibrator 101 is added in this condition, a Coriolis force is generated in a direction orthogonal to the vibrating direction. The vibrating direction of the first vibrator 101 is changed by the Coriolis force and results in a signal according to the rotational angular velocity being generated between the two first piezoelectric elements 105. The signal is detected by a detection circuit to output a detected signal corresponding to the rotational angular velocity around the axis of the first vibrator.

Similarly, when the rotational angular velocity around the axis of the second vibrator 102 is added, the signal according to the rotational angular velocity is generated between the two second piezoelectric elements 106. This signal is detected by the detection circuit to output a detected signal corresponding to the rotational angular velocity around the axis of the second vibrator.

This vibrating gyroscope 100 is thus capable of detecting two rotational angular velocities around two axes, i.e., the rotational angular velocity around the axis of the first vibrator 101 and the rotational angular velocity around the axis of the second vibrator 102.

The vibrating gyroscope 100 has the following problems. First, an interference (a beat) is generated when the resonance frequencies of two vibrators are close to each other. A false angular velocity signal can, thus, be generated from each vibrator. This necessitates sufficiently separating the resonance frequencies in the driving direction and the detecting direction of the respective vibrators from each other by taking countermeasures such as by shaping each vibrator differently and completely attenuating the beat frequency whose component includes the difference in the resonance frequencies by using, e.g., a low-pass filter.

Respective drive circuits and detection circuits are required for the two kinds of vibrators, resulting in a number of circuits twice that of a single axis gyroscope, thereby doubling the cost.

A beat can be eliminated by exciting vibrators in two directions at the same frequency and the same phase. That is, a beat can be eliminated if the two resonance frequencies of the two vibrators in the driving direction are in complete agreement with each other.

However, it is practically impossible to make two resonance frequencies completely agree with each other, taking into consideration the temperature characteristic.

FIG. 9 shows a second example of a vibrating gyroscope disclosed in Japanese Unexamined Patent Publication No. 6-3153.

The vibrating gyroscope 110 includes a disk-like vibrating body 112. Fan-shaped piezoelectric elements 114a, 114b, 114c, 114d, 114e, 114f, 114g, 114h whose central angle is approximately 45° are formed on one major plane of the vibrating body 112, and these piezoelectric elements 114a–114h are used for detection to obtain a signal corresponding to the rotational angular velocity.

A disk-shaped piezoelectric element 116 is formed on the other major plane of the vibrating body 112, and used for driving in order to flexural-vibrate the vibrating body 112.

The piezoelectric elements 114a,114d and the piezoelectric elements 114e,114h are connected to a first detection circuit (not shown), while the piezoelectric elements 114b, 114g and the piezoelectric elements 114c,114f are connected to a second detection circuit (not shown).

Here, the x-axis direction is defined as the direction orthogonal to the major plane of the vibrating body 112; the y-axis direction is defined as the direction which is orthogonal to the x-axis direction and passes between the piezoelectric elements 114a, 114b, 114g, 114h and the piezoelectric elements 114c, 114d, 114e, 114h, 114f; and the z-axis direction is defined as the direction which is orthogonal to the x-axis direction and passes between the piezoelectric elements 114a, 114b, 114c, 114d and the piezoelectric elements 114e, 114f, 114g, 114h.

When a drive signal from a drive circuit (not shown) is applied to the piezoelectric element 116, the vibrating body 112 is vibrated in the so-called concentric mode wherein a center part of the disk is vibrated reciprocally in the x-axis direction.

When a rotational angular velocity is applied around the z-axis in this condition, a Coriolis force is exerted in the y-axis direction. A difference is generated thereby between the voltage generated in the piezoelectric elements 114a, 114d and the voltage generated in the piezoelectric elements 114e,114h, and the difference is detected by the first detection circuit to obtain the rotational angular velocity applied around the z-axis.

Similarly, when a rotational angular velocity is applied around the y-axis, a Coriolis force is exerted in the z-axis direction. A difference is generated thereby between the voltage generated in the piezoelectric elements 114b,114g and the voltage generated in the piezoelectric elements 114c, 114f, and the difference is detected by the second detection circuit to obtain the rotational angular velocity applied around the y-axis.

Thus, the vibrating gyroscope 110 is capable of detecting two rotational angular velocities around two axes, i.e., the rotational angular velocity around the y-axis and the rotational angular velocity around the z10 axis in the vibrating body 112.

In the vibrating gyroscope 110, the interference of two resonance frequencies around two axes which is the problem raised in the first conventional example is solved because only one vibrating body is present and is vibrated in a mode where the resonance frequencies in the driving direction and in the detecting direction are in complete agreement with each other around two axes.

Also, only one drive circuit is sufficient, and the cost of the circuit is reduced compared with that of the first conventional example.

The second conventional example is of a plane structure comprising flat plates, which is excellent in workability compared with a structure with a three-dimensional arrangement as in the first conventional example.

However, in the second conventional example, the change in the flexural displacement of the piezoelectric element by the Coriolis force generated in the horizontal direction of a flat-shaped vibrating body is detected. Generally speaking, when the force in the horizontal direction is applied to the flat plate, the deformation of the flat plate caused by the force is very small, and even when the force is applied to the flat plate vibrating body, the displacement of the flat plate is small, and thus, the flexural displacement of the piezoelectric element is also small, as is the detected signal to be obtained. Accordingly, only a vibrating gyroscope of low sensitivity can be obtained.

SUMMARY OF THE INVENTION

The present invention provides a vibrator which can solve the aforementioned problems associated with the conventional art and can detect angular velocities around two axes with high sensitivity and high accuracy.

The vibrator comprises a flat-plate vibratable body and four notches provided toward the center of the vibrating body from four parts of the outer periphery of the vibrating body with approximately equal intervals.

The notches extend from one major surface of the vibratable body to an opposing major surface.

The vibrating gyroscope of the present invention is a vibrating gyroscope using a vibrator including a flat-plate vibratable body and four notches provided toward the center of the vibrating body from four parts of the outer periphery of the vibrating body with approximately equal intervals, the notches extending from one major surface of the vibratable body to an opposing major surface. The vibrating body gyroscope further comprises a driving unit to vibrate the vibrator about two nodal axes and a first detecting unit to detect a first displacement caused by a first Coriolis force attributable to a first rotational angular velocity to be added to the vibrator.

The vibrating gyroscope may also include a second detecting unit to detect a second Coriolis force attributable to a second rotational angular velocity to be added to the vibrator.

Advantageously, the first and second angular velocities are applied in two directions orthogonal to each other in the plane of the vibrator.

Further, the nodal axes may be two axes extending between notches opposite to each other among the four notches.

Alternatively, the two nodal axes may be rotated by approximately 45° from axes extending between notches opposite to each other among the four notches.

Still further, the vibrator may be supported in the vicinity of the center point of the vibrator.

Because notches are provided in four directions of the periphery of the vibrator, the vibrator is easily bent in both the out-of-plane direction and the in-plane direction, thereby enabling a large amplitude to be obtained as increasing the sensitivity of the vibrating gyroscope.

Further, because the angular velocities around two axes are detected by one vibrator, a vibration mode in which the resonance frequency in the driving direction is in complete agreement with the resonance frequencies in two detecting directions can be utilized, and there is no problem that the resonance frequencies around two axes are in disagreement with each other. Thus, a vibrating gyroscope of more excellent accuracy is provided because the two axes are detected by one vibrator.

Because the center of the vibrator is the intersection of the two nodal axes, the nodal point of the vibrator is only one point of the center of the vibrator, and if the vibrator is supported in the vicinity of the center of the vibrator, stable vibration of the vibrator can be obtained without obstructing the vibration of the vibrator, and its support structure can be simplified.

Other features and advantages of the present invention will become apparent from the following description of the invention which refers to the accompanying drawings, in which there are several forms which are presently preferred, it being understood, however, that the invention is not limited to the precise arrangements and instrumentalities shown.

BRIEF DESCRIPTION OF THE DRAWING(S)

DETAILED DESCRIPTION OF THE PREFERRED EMBODIMENTS

Figure 1A:
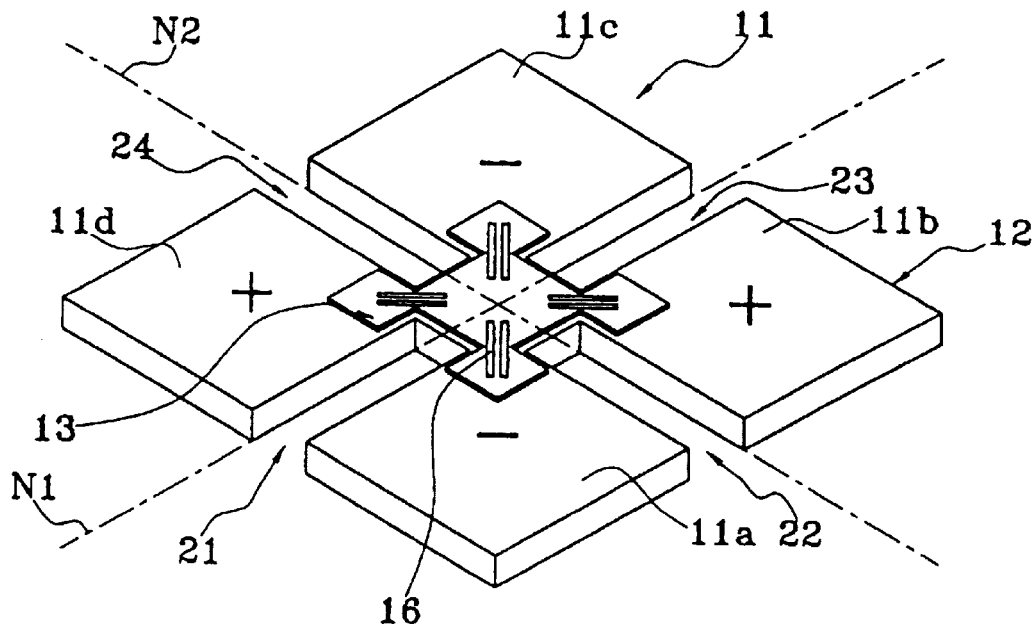
FIG. 1A is a perspective view of a vibrator and a vibrating gyroscope of a first embodiment of the present invention viewed from the upper side thereof.

Hereinafter, the preferred embodiments of the present invention are explained in detail with reference to the drawings.

FIGS. 1A, 1B, 2 and 3 show a vibrator of the first embodiment of the present invention, and a vibrating gyroscope using the vibrator. A vibrating gyroscope 10 includes a vibrator 11 of approximately a square plate shape. The vibrator 11 includes a vibrating body 12, a piezoelectric element 13 and a piezoelectric element 17.

The vibrating body 12 is formed of an approximately square plate consisting of a constantly elastic metallic material such as elinvar. Four notches 21, 22, 23, 24 are formed from respective approximate middle points of four sides of the vibrating body 12, i.e., from four parts of the outer periphery of the vibrating body 12 with approximately equal intervals, toward the center point of the vibrating body 12.

The vibrator 11 is divided into four areas by the center lines along the direction in which the four notches 21, 22, 23, 24 extend respectively. That is, the areas surrounded by the center lines of the notches 21 and 22, the notches 22 and 23, the notches 23 and 24 and the notches 24 and 21 are respectively defined as a first area 11a, a second area 11b, a third area 11c and a fourth area 11d. Each of the first to fourth areas 11a–11d has a shape in which a large rectangular section and a small rectangular section are connected at respective common corners, and the small rectangular sections of the first to fourth areas 11a–11d integrally form a center portion interposed between the notches 21 and 23 and between the notches 22 and 24.

The piezoelectric element 13 is used for detecting the vibration of the vibrating body 12 and is disposed at a general center part of one major plane of the vibrating body 12. More specifically, the piezoelectric element 13 is provided so as to cover the small rectangular sections and a portion of the large rectangular section of each of the first to fourth areas 11a–11d.

Figure 2:
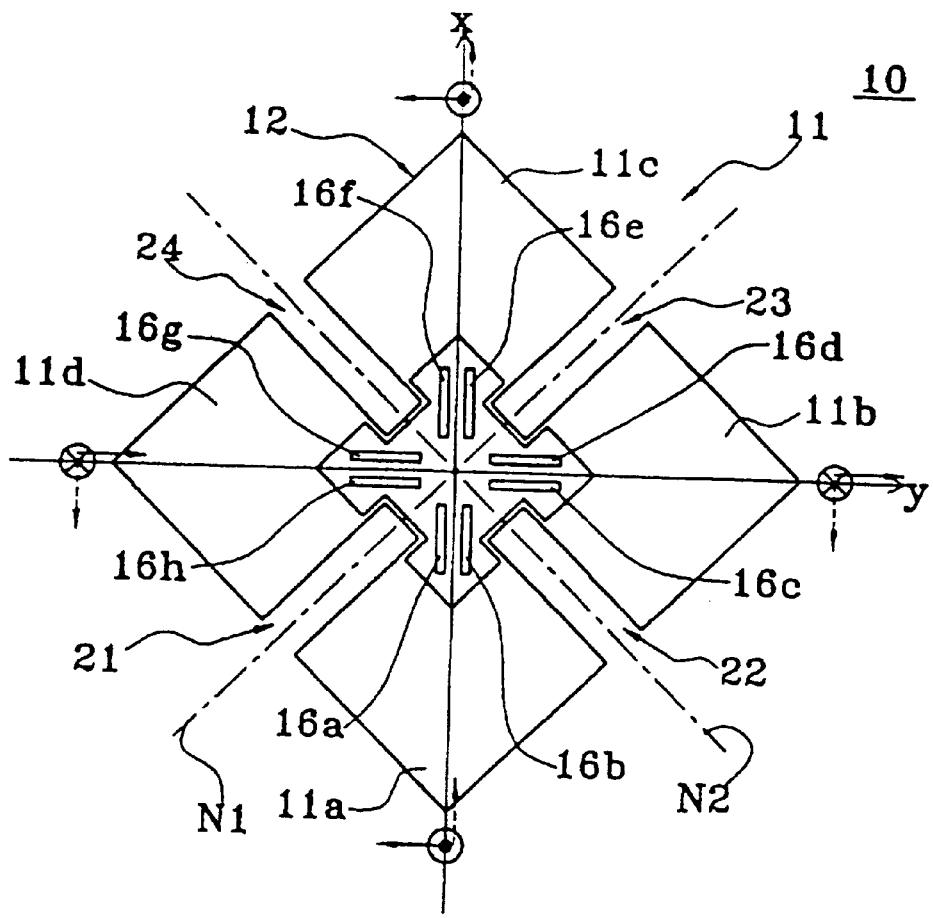
FIG. 2 is a plan view of a vibrator and a vibrating gyroscope of the first embodiment of the present invention.
Figure 3:
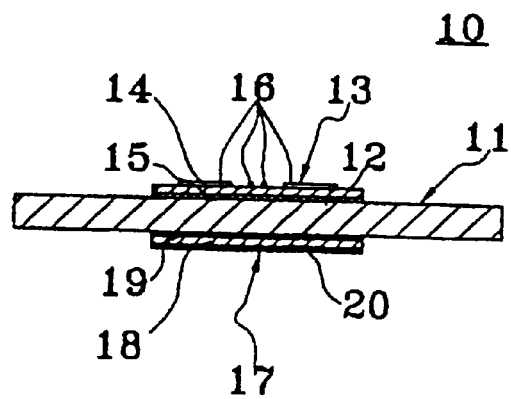
FIG. 3 is a section in the x-axis direction of the vibrator and vibrating gyroscope shown in FIG. 2.

Referring to FIGS. 2 and 3, the piezoelectric element 13 includes a piezoelectric plate 14 consisting of a piezoelectric ceramic such as PZT, a full electrode 15 provided on the whole of one major surface of the piezoelectric plate 14 and a plurality of split electrodes 16a, 16b, 16c, 16d, 16e, 16f, 16g and 16h on the other major surface of the piezoelectric plate 14. Note that in FIGS. 1A and 3, the split electrodes 16a–16h are collectively denoted by reference numeral 16 for clarity. The detailed arrangement of the split electrodes 16a–16h will be explained latter. The piezoelectric element 13 is adhered to the vibrating body 12 through the full electrode 15.

The piezoelectric element 17 is used for driving the vibrating body 12 and is disposed at a generally center part of the other major plane of the vibrating body 12 which corresponds to the area where the piezoelectric element 13 is formed on the one major surface of the vibrating body 12. The piezoelectric element 17 includes a piezoelectric plate 18, and a pair of full electrodes 19, 20 provided on both of the whole major surfaces of the piezoelectric plate 18. The piezoelectric element 17 is adhered to the vibrating body 12 through the full electrode 19.

The vibrating gyroscope 10 of the first embodiment is vibrated in an axis-symmetric mode with two axes connecting notches opposite to each other among four notches 21,22,23,24 as the nodal axes of the vibration of the vibrator 11. The axis extending through the notch 21 and the notch 23 is defined as the nodal axis N1, while the axis extending through the notch 22 and the notch 24 is defined as the nodal axis N2.

Figure 1B:
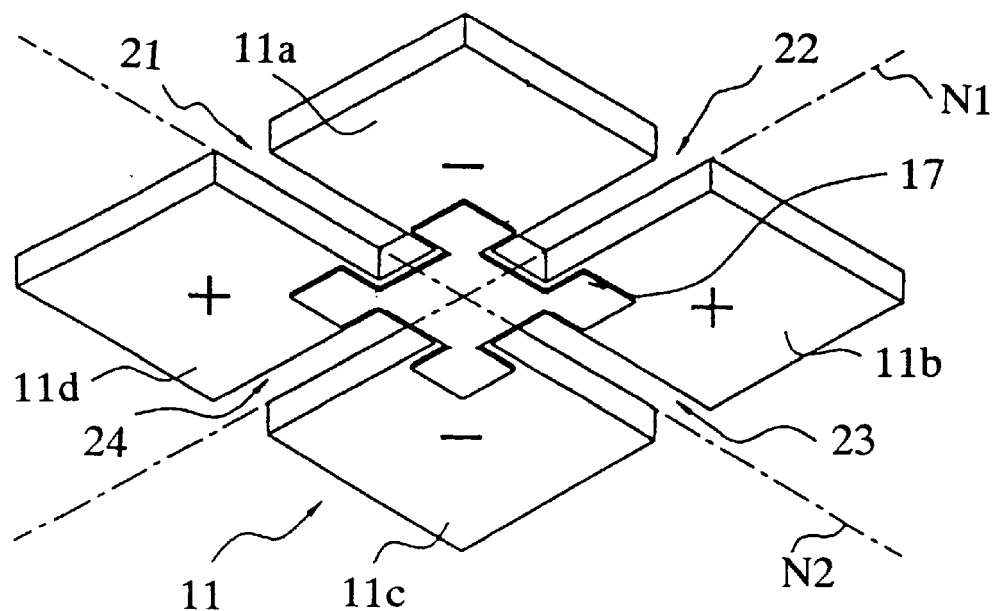
FIG. 1B is a perspective view of the vibrator and the vibrating gyroscope of FIG. 1A viewed from the bottom side thereof.

The vibrator 11 is vibrated by applying the drive signal to the piezoelectric element 17. In order to vibrate the vibrator 11 in an axis-symmetric mode with the nodal axes N1, N2 as the nodal axes, it is necessary to invert the polarity of the polarization within the piezoelectric element 17 at the boundary formed by the nodal axes N1, N2. Thus, the polarization in the thickness direction of the piezoelectric element 17 is achieved so that the polarization direction is opposite to each other at the part of the piezoelectric element 17 corresponding to the first area 11a and the third area 11c, and at the part of the piezoelectric element 17 for drive corresponding to the second area 11b and the fourth area 11d. In FIGS. 1A and 1B, the first area 11a and the third area 11c of the vibrator 11 are denoted as "+", and the second area 11b and the fourth area 11d are denoted as "−".

The piezoelectric element 13 for detection is polarized in the same direction in the thickness direction in the whole area. As shown in FIG. 2, the split electrodes 16a–16h are arranged such that each pair of the split electrodes 16a–16h are disposed in the corresponding one of four areas defined by the nodal axes N1 and N2.

As illustrated in FIG. 2, assuming that, among two diagonal directions of the vibrator 11 of approximately square shape, the diagonal direction extending from the first area 11a to the third area 11c is defined as the x-axis direction, and the diagonal direction extending from the second area 11b to the fourth area 11d is defined as the y-axis direction. The x-axis direction and the y-axis direction indicate the axial directions of two rotational angular velocities to be detected by the vibrating gyroscope 10. The split electrodes 16a–16h are formed to interpose the x-axis direction and the y-axis direction. More specifically, the split electrodes 16a and 16b are disposed in the first area 11a so as to interpose the x-axis. In the same way, the split electrodes 16c and 16d, the split electrodes 16e and 16f and the split electrodes 16g and 16h are disposed in the second area 11b, the third area 11c and the fourth area 11d, respectively such that the split electrodes 16e and 16f interpose the x axis, and that the split electrodes 16c and 16d and the split electrodes 16g and 16h interpose the y axis, respectively.

Figure 4:
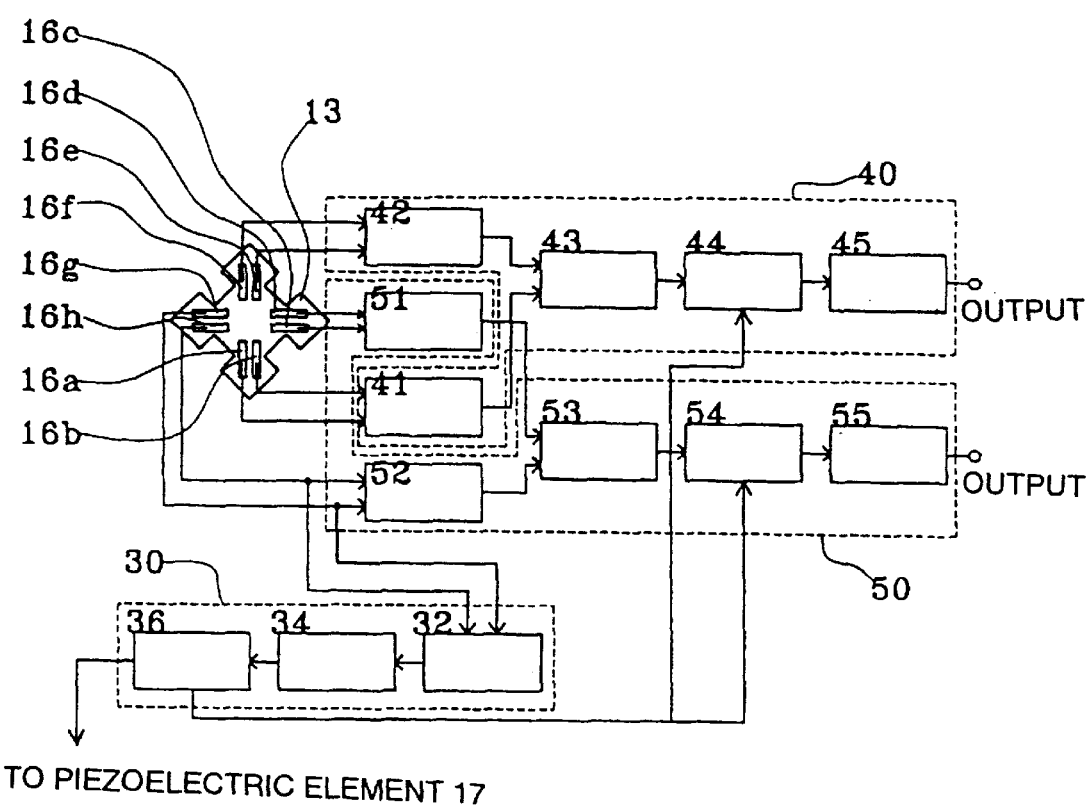
FIG. 4 is a schematic circuit illustrating the action of the vibrating gyroscope of the first embodiment of the present invention.

The vibrating gyroscope 10 using the vibrator 11 of such a constitution is connected in a circuit as illustrated in FIG. 4.

An output end of an oscillation circuit 30 is connected to the piezoelectric element 17 for drive (not shown in the figure). An input end of the oscillation circuit 30 is connected to the piezoelectric element 13 for detection. More specifically, the oscillation circuit 30 includes an adder 32, and the output signal of the piezoelectric element 13 for detection taken from the split electrodes 16h and 16h, is received by the adder 32 as a feedback signal. The output signal of the adder 32 is phase-corrected by a phase shifter 34, and, further, the amplitude is regulated by an AGC circuit 36 (an Automatic Gain Control circuit). The output signal of the AGC circuit 36 is given to the piezoelectric element 17 for drive as the drive signal.

The split electrodes 16a, 16b of the piezoelectric element 13 for detection are connected to an input end of a first detection circuit 40. The split electrodes 16e, 16f of the piezoelectric element 13 for detection are also connected to the input end of the first detection circuit 40. The split electrodes 16a,16b,16e,16f are arranged at positions along the x-axis direction.

The split electrodes 16c, 16d of the piezoelectric element 13 for detection are connected to a second detection circuit 50. The split electrodes 16g, 16h of the piezoelectric element 13 for detection are also connected to the second detection circuit 50. The split electrodes 16c,16d,16g,16h are arranged at positions along the y-axis direction.

The first detection circuit 40 includes differential circuits 41,42. The signal to be outputted from the split electrodes 16a,16b is received by the differential circuit 41 and the difference in the output signal is detected. Similarly, the signal to be outputted from the split electrodes 16e,16f is received by the differential circuit 42, and the difference in the output signal is detected. The output signal of the differential circuit 41 and the output signal of the differential circuit 42 are received by an adder 43 and synthesized. The output signal of the adder 43 is received by a synchronous detection circuit 44, and detected synchronously to the signal of the phase circuit 34 in the oscillation circuit 30. The signal detected by the synchronous detection circuit 44 is smoothed and amplified by a smoothing and DC amplifier 45, and outputted as the output signal from the first detection circuit 40.

The second detection circuit 50 includes differential circuits 51,52. The signal to be outputted from the split electrodes 16c,16d is received by the differential circuit 51 and the difference in the output signal is detected. Similarly, the signal to be outputted from the split electrodes 16g,16h is received by the differential circuit 52, and the difference in the output signal is detected. The output signal of the differential circuit 51 and the output signal of the differential circuit 52 are received by an adder 53 and synthesized. The output signal of the adder 53 is received by a synchronous detection circuit 54, and detected synchronously to the signal of the phase circuit 34 in the oscillation circuit 30. The signal detected by the synchronous detection circuit 54 is smoothed and amplified by a smoothing and DC amplifier 55, and outputted as the output signal from the second detection circuit 50.

In this vibrating gyroscope 10, the piezoelectric element 17 for drive is expanded/contracted corresponding to the direction of its polarization by applying a drive signal to the piezoelectric element 17 for drive. That is, as illustrated in FIG. 1B, if the part of the piezoelectric element 17 for drive corresponding to the first area 11a and the third area 11c indicated by "+" is bent upward in the thickness direction, the part of the piezoelectric element 17 for drive corresponding to the second area 11b and the fourth area 11d indicated by "−" is bent downward in the thickness direction, and the vibrating body 12 is also bent thereby, and as a whole, the first area 11a and the third area 11c of the vibrator 11 is bent upward in the thickness direction, while the second area 11b and the fourth area 11d of the vibrator 11 are bent downward in the thickness direction.

As illustrated in FIG. 2, when the rotational angular velocity is added around the x-axis direction, the Coriolis force as indicated by the solid arrow is exerted on the vibrator 11 in the direction orthogonal to the bending direction.

The first area 11a and the third area 11c of the vibrator 11 are bent by the Coriolis force in the direction of the solid arrow, and an in-plane vibration is generated.

The piezoelectric element 13 for detection is also in-plane vibrated thereby, and the Coriolis signals attributable to the rotational angular velocity around the x-axis direction are outputted from the split electrodes 16a,16b,16e,16f which are arranged along the x-axis direction. The Coriolis signals attributable to the rotational angular velocity around the x-axis direction are received by the first detection circuit 40 through the split electrodes 16a,16b,16e,16f, and detected.

When the rotational angular velocity is added around the y-axis direction, the Coriolis force as indicated by the broken arrow is exerted on the vibrator 11 in the direction orthogonal to the bending direction.

The second area 11b and the fourth area 11d of the vibrator 11 are bent by the Coriolis force in the direction of the broken arrow, and an in-plane vibration is generated.

The piezoelectric element 13 for detection is also in-plane vibrated thereby, and the Coriolis signals attributable to the rotational angular velocity around the y-axis direction are outputted from the split electrodes 16c,16d,16g,16h which are arranged along the y-axis direction. The Coriolis signals attributable to the rotational angular velocity around the y-axis direction are received by the second detection circuit 50 through the split electrodes 16c,16d,16g,16h, and detected.

In the vibrating gyroscope 10 of such a constitution, the notches 21,22,23,24 are provided in four directions of the periphery of the vibrator 11, the vibrator 11 is easily bent in the out-of-plane direction by the signal applied to the piezoelectric element 17 for drive, and the Coriolis force is also increased. The vibrator 11 is in-plane vibrated by the Coriolis force in the in-plane direction, and the vibrator 11 is easily bent also in the in-plane direction due to the presence of the notches 21–24, and a large amplitude attributable to the Coriolis force can be obtained, thereby increasing the amplitude of the Coriolis signal, which, in turn, improves the sensitivity of the vibrating gyroscope.

Because the angular velocities in two detecting direction (the x-axis direction and the y-axis direction) are detected by one vibrator 11, a vibration mode in which the resonance frequency in the driving direction is in complete agreement with the resonance frequency in two detecting directions can be utilized. Accordingly, there is no problem of disagreement of the resonance frequencies in two detecting directions, and a vibrating gyroscope of more excellent accuracy can be obtained because the angular velocities in two directions are detected by one vibrator.

Figure 5:
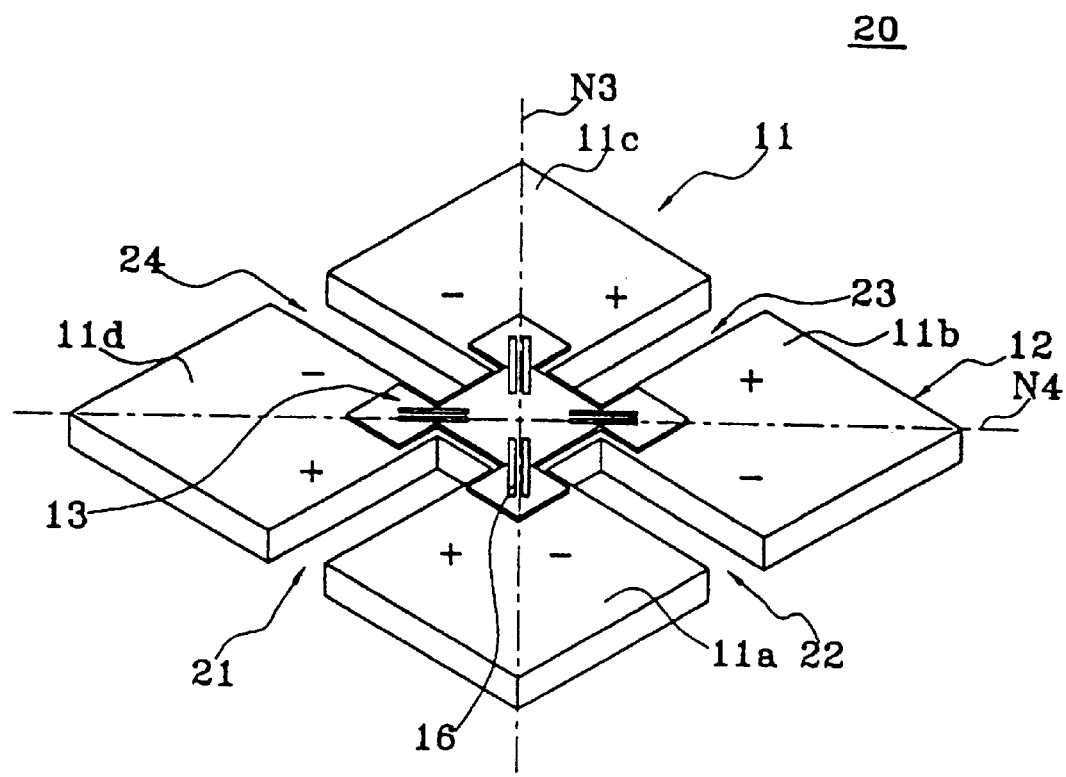
FIG. 5 is a perspective view of a vibrator and a vibrating gyroscope of a second embodiment of the present invention viewed from the upper side thereof.
Figure 6:
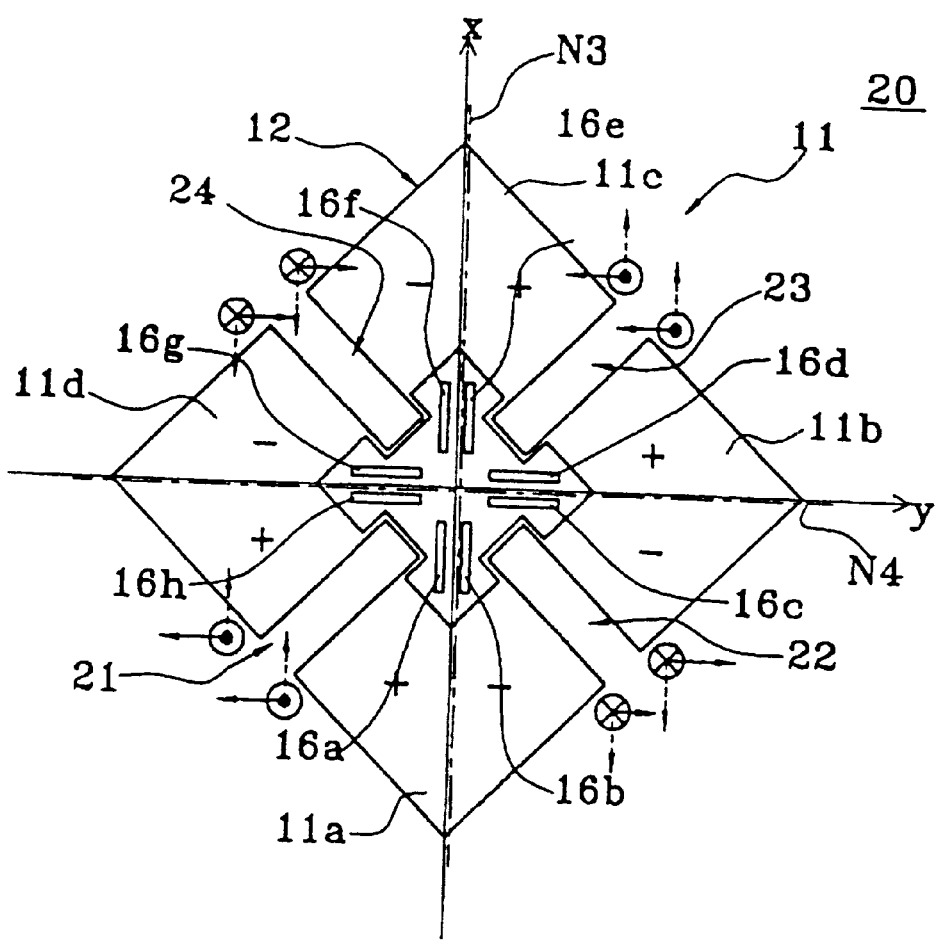
FIG. 6 is a plan view of the vibrator and the vibrating gyroscope of the second embodiment of the present invention.

A vibrating gyroscope 20 of the second embodiment of the present invention is illustrated in FIGS. 5 and 6. The same numbers are given to the same components as that of the vibrating gyroscope 10 illustrated in the first embodiment, and a detailed explanation thereof is omitted.

The vibrating gyroscope 20 differs from that of the vibrating gyroscope 10 of the first embodiment, in that two diagonals of the vibrator 11, i.e., two axes which are rotated by approximately 45° from the axes 30 extending through the four notches 21–24, are the nodal axes of vibration.

The nodal axis extending from the first area 11a to the third area 11c of the vibrator 11 is denoted as N3, and the nodal axis extending from the second area 11b to the fourth area lid is denoted as N4, and in order to vibrate the vibrator 11 in the axis-symmetric mode with two nodal axes N3,N4 as the nodal axes of the vibration, it is necessary to invert the polarity of the polarization within the piezoelectric element 17 for drive with the nodal axes N3,N4 as the boundary. Thus, the polarization of the piezoelectric element 17 for drive in the thickness direction is divided by the nodal axes N3,N4 so that the areas across the notches 21,23 are opposite to the areas across the notches 22,24 in the direction of polarization. In FIG. 5 and FIG. 6, the areas across the notches 21,23 of the vibrator 11 are denoted as "+", while the areas across the notches 22,24 are denoted as "−".

In this vibrating gyroscope 20, the piezoelectric element 17 for drive is expanded/contracted corresponding to the direction of its polarization by applying a drive signal to the piezoelectric element 17 for drive. That is, as illustrated in FIG. 5 and FIG. 6, if the area indicated by "+" is bent upward in the thickness direction, the area indicated by "−" is bent downward in the thickness direction, and the vibrating body 12 is also bent thereby, and as a whole, the vibrator 11 is flexural-vibrated.

When the rotational angular velocity is added around the x-axis direction, the Coriolis force indicated by the solid arrow is exerted on the vibrator 11 in the direction orthogonal to the bending direction. The second area 11b and the fourth area 11d of the vibrator 11 are bent rotatably in the direction of the solid arrow with the center point of the vibrator 11 as the axis of rotation, and an in-plane vibration is generated.

The piezoelectric element 13 for detection is also in-plane vibrated thereby, and the Coriolis signals attributable to the rotational angular velocity around the x-axis direction are outputted from the split electrodes 16c,16d,16g,16h. The Coriolis signals attributable to the rotational angular velocity around the x-axis direction are received by the first detection circuit 40, and the signal is detected.

Similarly, when the rotational angular velocity is added around the y-axis direction, the Coriolis force indicated by the broken arrow is exerted on the vibrator 11 in the direction orthogonal to the bending direction.

The first area 11a and the third area 11c of the vibrator 11 are bent rotatably in the direction of the broken arrow with the center point of the vibrator 11 as the axis of rotation, and the in-plane vibration is generated.

The piezoelectric element 13 for detection is also in-plane vibrated thereby, and the Coriolis signals attributable to the rotational angular velocity around the y-axis direction are outputted from the split electrodes 16a,16b,16e,16f. The Coriolis signals attributable to the rotational angular velocity around the y-axis direction are received by the second detection circuit 50, and the signal is detected.

Similar to the vibrating gyroscope 10 illustrated in the first embodiment, in the vibrating gyroscope 20 of such a constitution, the notches 21,22,23,24 are provided in four directions of the periphery of the vibrator 11, the vibrator 11 is easily bent in the out-of-plane direction by the signal applied to the piezoelectric element 17 for drive, and the Coriolis force is also increased. The vibrator 11 is in-plane vibrated by the Coriolis force in the in-plane direction. The vibrator 11 is easily bent also in the in-plane direction due to the presence of the notches 21,24, and a large amplitude attributable to the Coriolis force can be obtained, thereby increasing the amplitude of the Coriolis signal, which, in turn, improves the sensitivity of the vibrating gyroscope.

Because the angular velocities in two detecting directions are detected by one vibrator 11, a vibration mode in which the resonance frequency in the driving direction is in complete agreement with the resonance frequency in two detecting directions can be utilized. Accordingly, there is no problem of disagreement of the resonance frequencies in two detecting directions, and a vibrating gyroscope of more excellent accuracy can be obtained because the angular velocities in two directions are detected by one vibrator.

Figure 7:
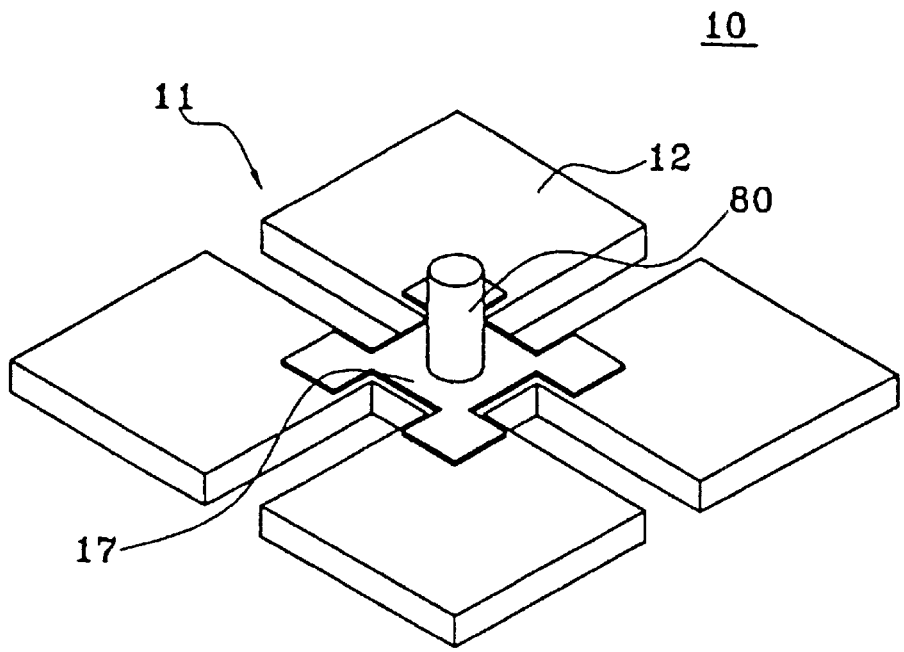
FIG. 7 is a perspective view of a support structure for the vibrator and the vibrating gyroscope of the embodiments of the present invention viewed from the upper side thereof.
Figure 8:
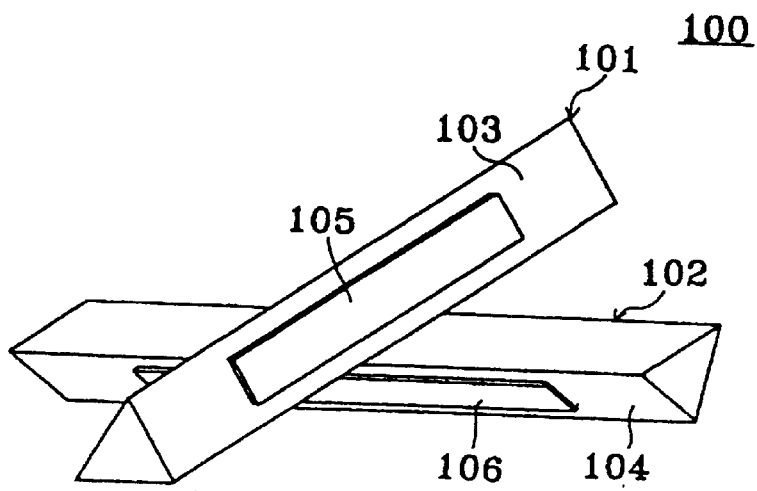
FIG. 8 is a perspective view illustrating a first example of a conventional vibrating gyroscope.
Figure 9:
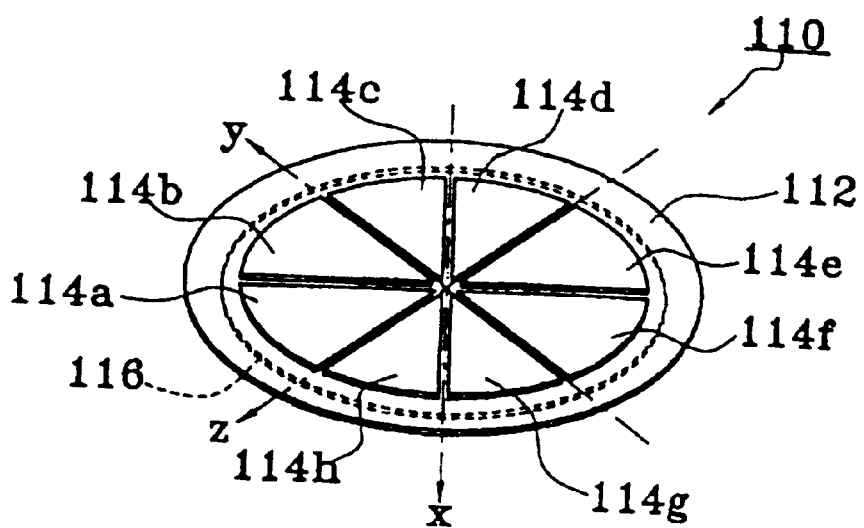
FIG. 9 is a perspective view viewed from the upper side illustrating a second example of a conventional vibrating gyroscope.

In the vibrating gyroscope 10 of the first embodiment and the vibrating gyroscope 20 of the second embodiment, the center point of the vibrator 11 is the intersection of two nodal axes, and the nodal point of the vibrator 11 is only one point, i.e., the center point of the vibrator 11. Thus, for example, as illustrated in FIG. 7, if the vibrator 11 is supported by mounting a columnar support member 80 in the vicinity of the center point of the vibrator 11, stable vibration of the vibrator 11 can be obtained without obstructing the vibration of the vibrator 11, and the support structure is also simplified.

In the embodiments of the present invention, the vibrator is of a structure where a plate-shaped piezoelectric element is attached to a metallic vibrating body, is not limited thereto, and a vibrator in which a vibrator body consists of a plate-shaped piezoelectric ceramic, and an electrode formed on the surface of the vibrating body with appropriate polarization, may be used.

A vibrator of approximately square shape is illustrated, but the invention not limited thereto, and those of disk shape or polygonal shape may be selected according to the purpose.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A vibrating gyroscope comprising:
   a vibrator including a vibratable body having a flat plate shape and four notches provided from four parts of the outer periphery of said vibratable body with approximately equal intervals to a center of said vibrating body, said notches extending from one major surface of said vibratable body to an opposing major surface;
   a driving unit to vibrate said vibrator under an axis-symmetric mode with two axes extending between notches opposite to each other among said four notches as two nodal axes; and
   a first detecting unit to detect a first displacement caused by a first Coriolis force attributable to a first rotational angular velocity to be added to said vibrator.

2. A vibratable gyroscope according to claim 1, further including a second detecting unit to detect a second displacement caused by a second Coriolis force attributable to a second rotational angular velocity to be added to said vibrator.

3. A vibrating gyroscope according to claim 2, wherein the first and second rotational angular velocities are applied in two directions orthogonal to each other in the plane of said vibrator.

4. A vibrating gyroscope according to one of claims 1 to 3, wherein said vibrator is supported in the vicinity of a center point of said vibrator.

5. A vibrating gyroscope comprising:
- a vibrator including a vibratable body having a flat plate shape and four notches provided from four parts of the outer periphery of said vibratable body with approximately equal intervals to a center of said vibrating body, said notches extending from one major surface of said vibratable body to an opposing major surface;
- a driving unit to vibrate said vibrator under an axis-symmetric mode with two axes rotated by approximately 45° in the same plane from axes extending between notches opposite to each other among said four notches as two nodal axes; and
- a first detecting unit to detect a first displacement caused by a first Coriolis force attributable to a first rotational angular velocity to be added to said vibrator.

6. A vibrating gyroscope according to claim 5, further including a second detecting unit to detect a second displacement caused by a second Coriolis force attributable to a second rotational angular velocity to be added to said vibrator.

7. A vibrating gyroscope according to claim 6, wherein the first and second rotational angular velocities are applied in two directions orthogonal to each other in the plane of said vibrator.

8. A vibrating gyroscope according to one of claims 5 to 7, wherein said vibrator is supported in the vicinity of a center point of said vibrator.

\* \* \* \* \*